(No Model.) 10 Sheets—Sheet 1.

H. H. CUMMINGS.
MACHINE FOR PREPARING STRING FRAMINGS FOR PIANOS.

No. 556,493. Patented Mar. 17, 1896.

Witnesses. Inventor.

(No Model.) 10 Sheets—Sheet 2.
H. H. CUMMINGS.
MACHINE FOR PREPARING STRING FRAMINGS FOR PIANOS.
No. 556,493. Patented Mar. 17, 1896.

Witnesses.
Inventor

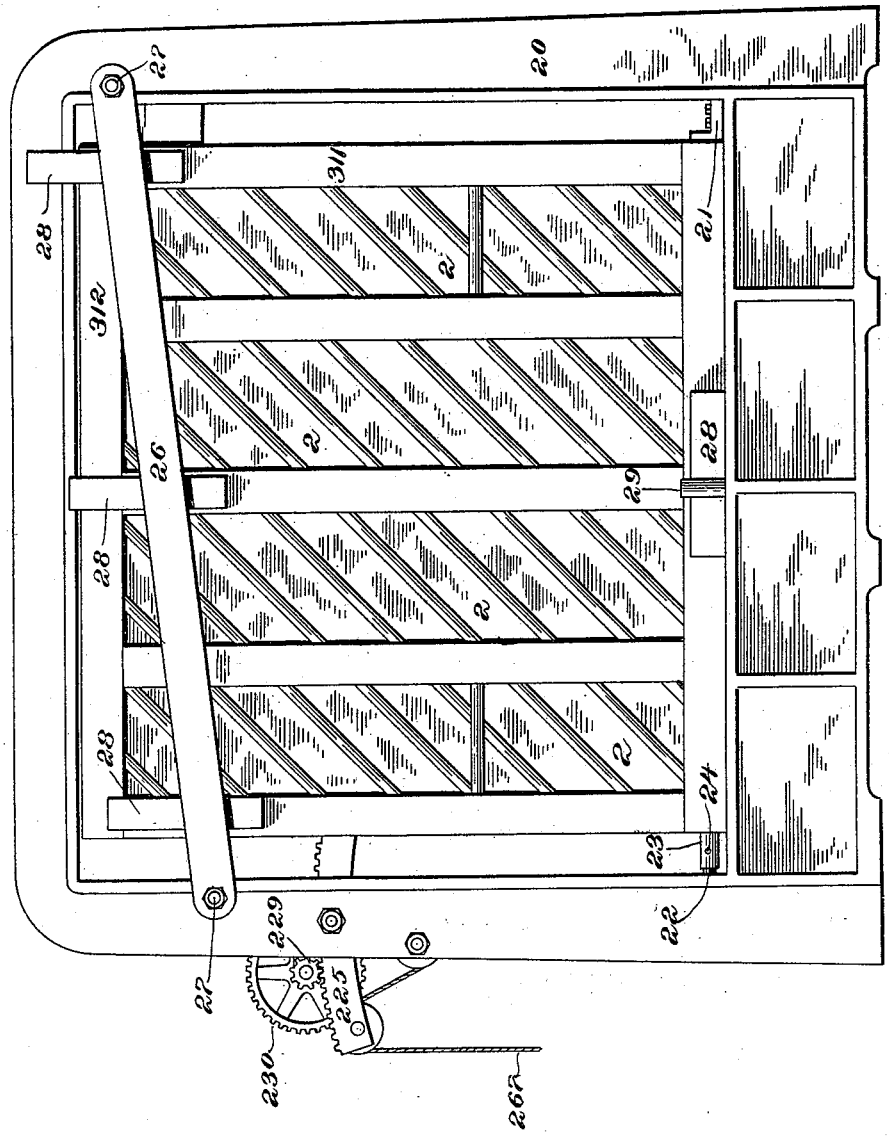

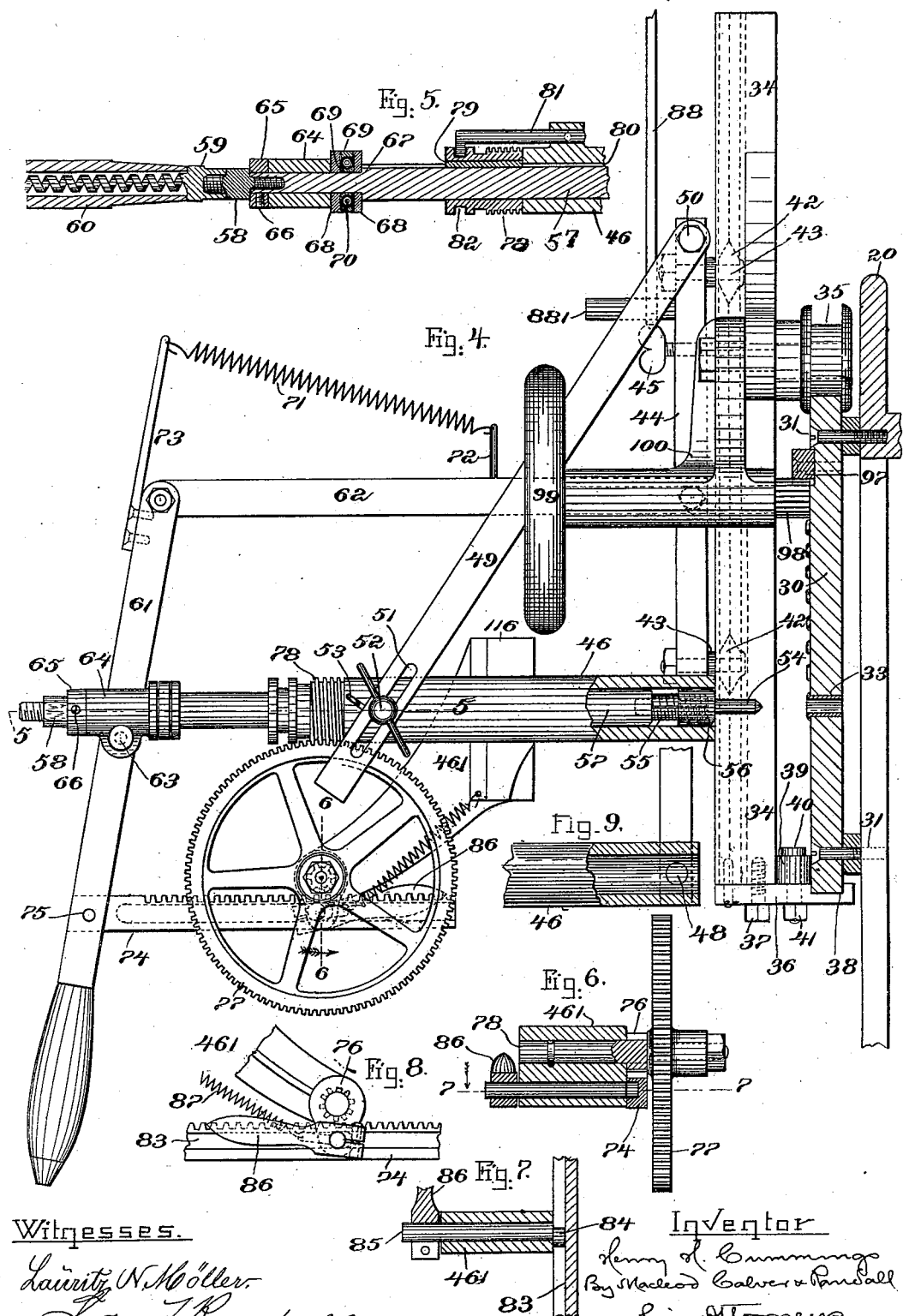

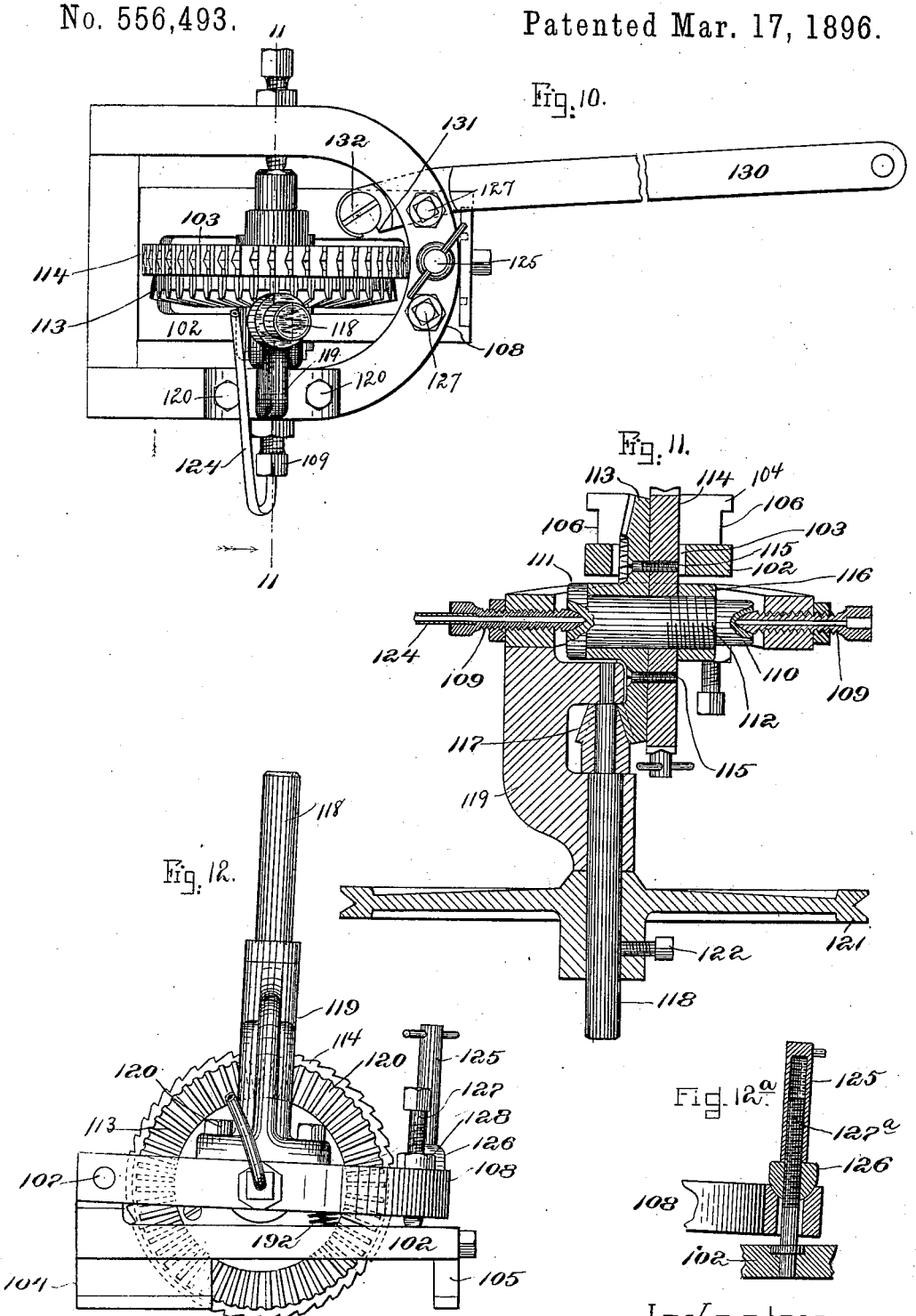

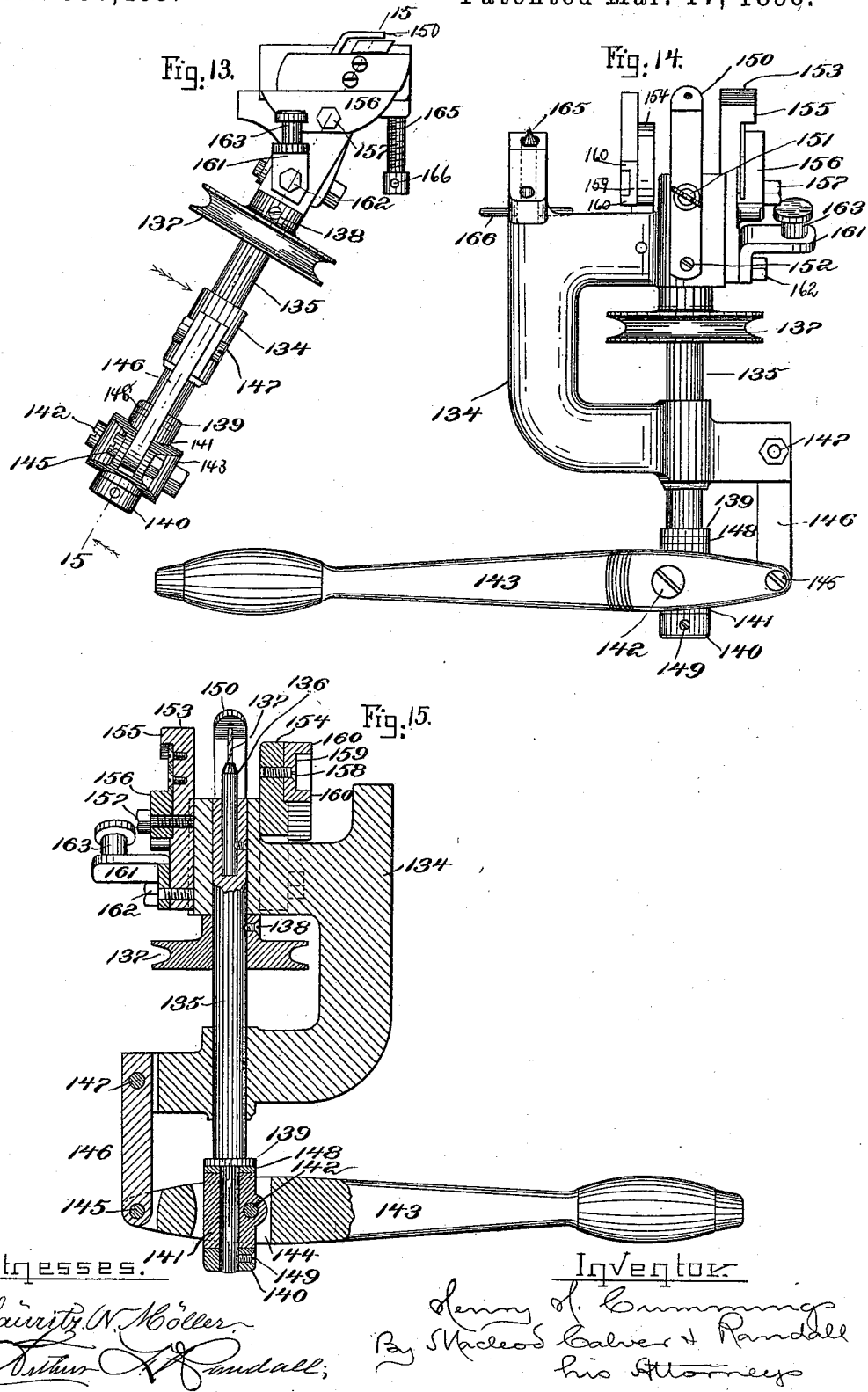

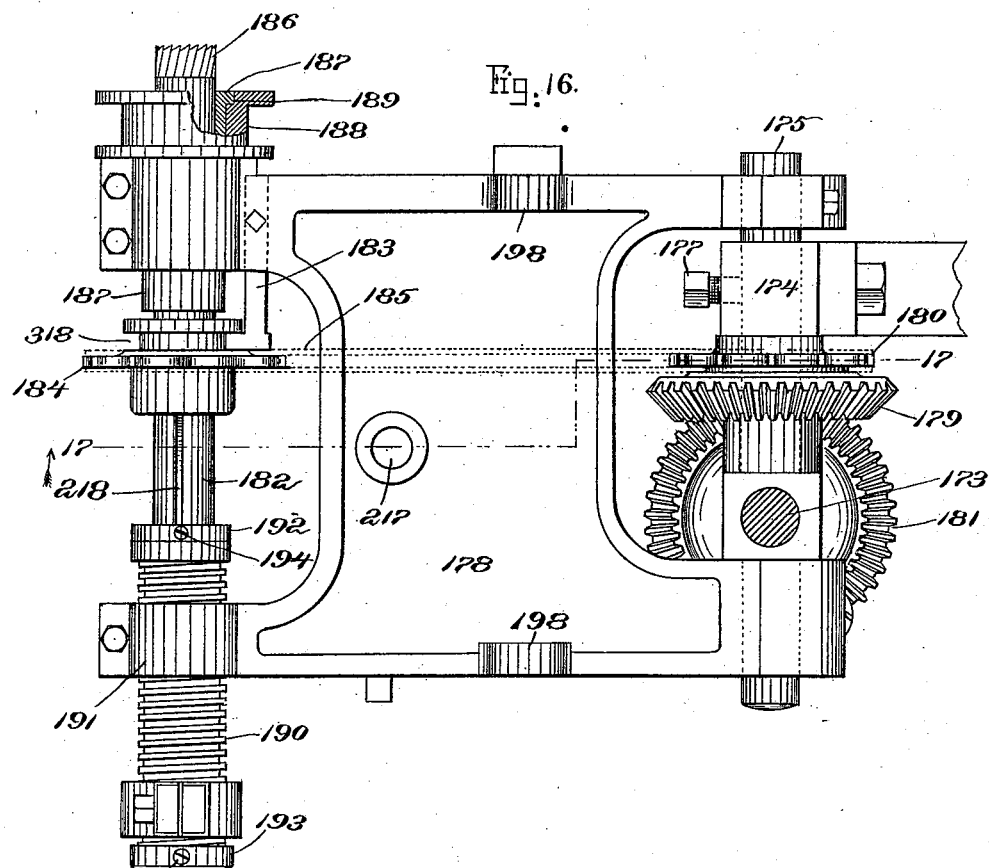

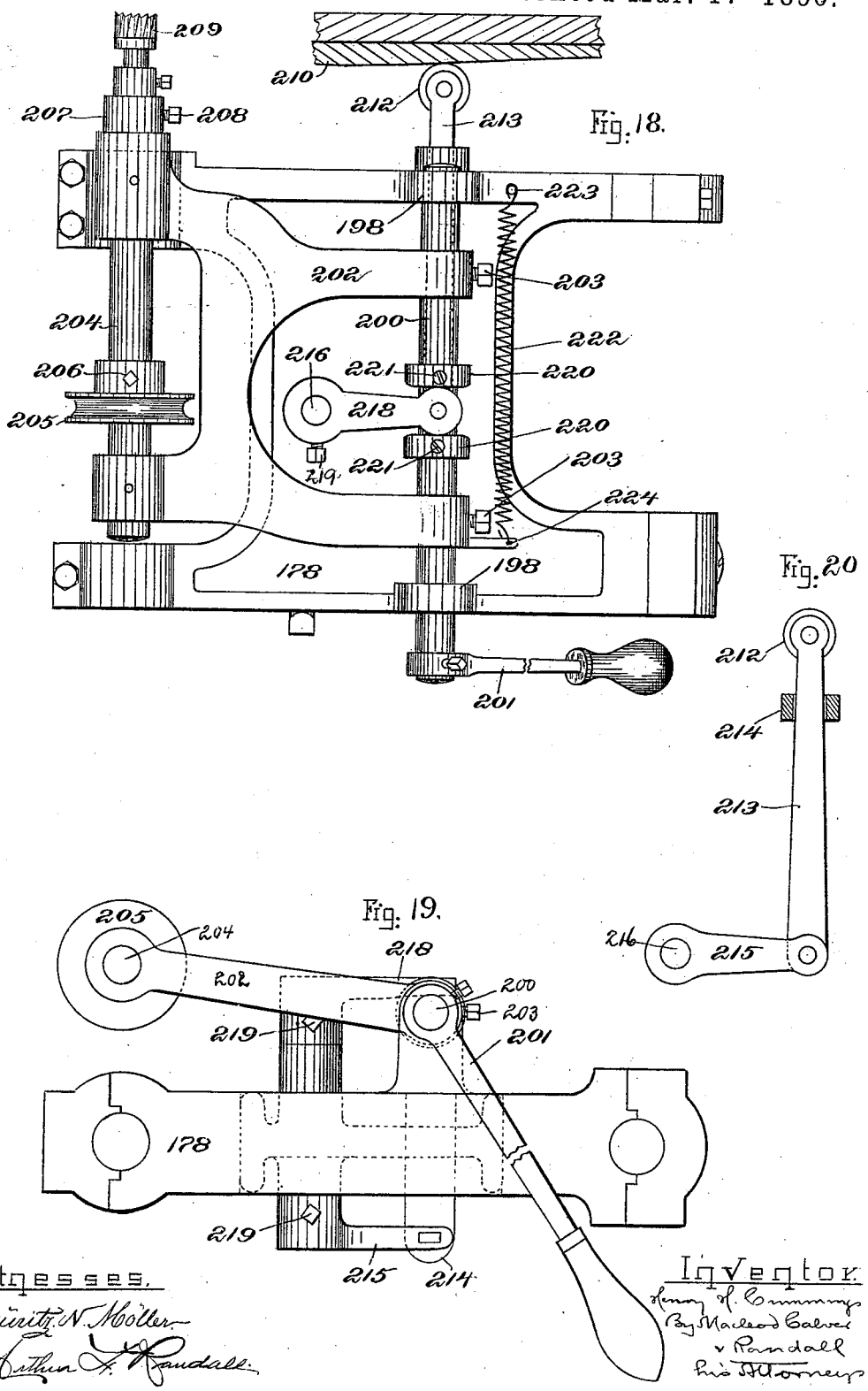

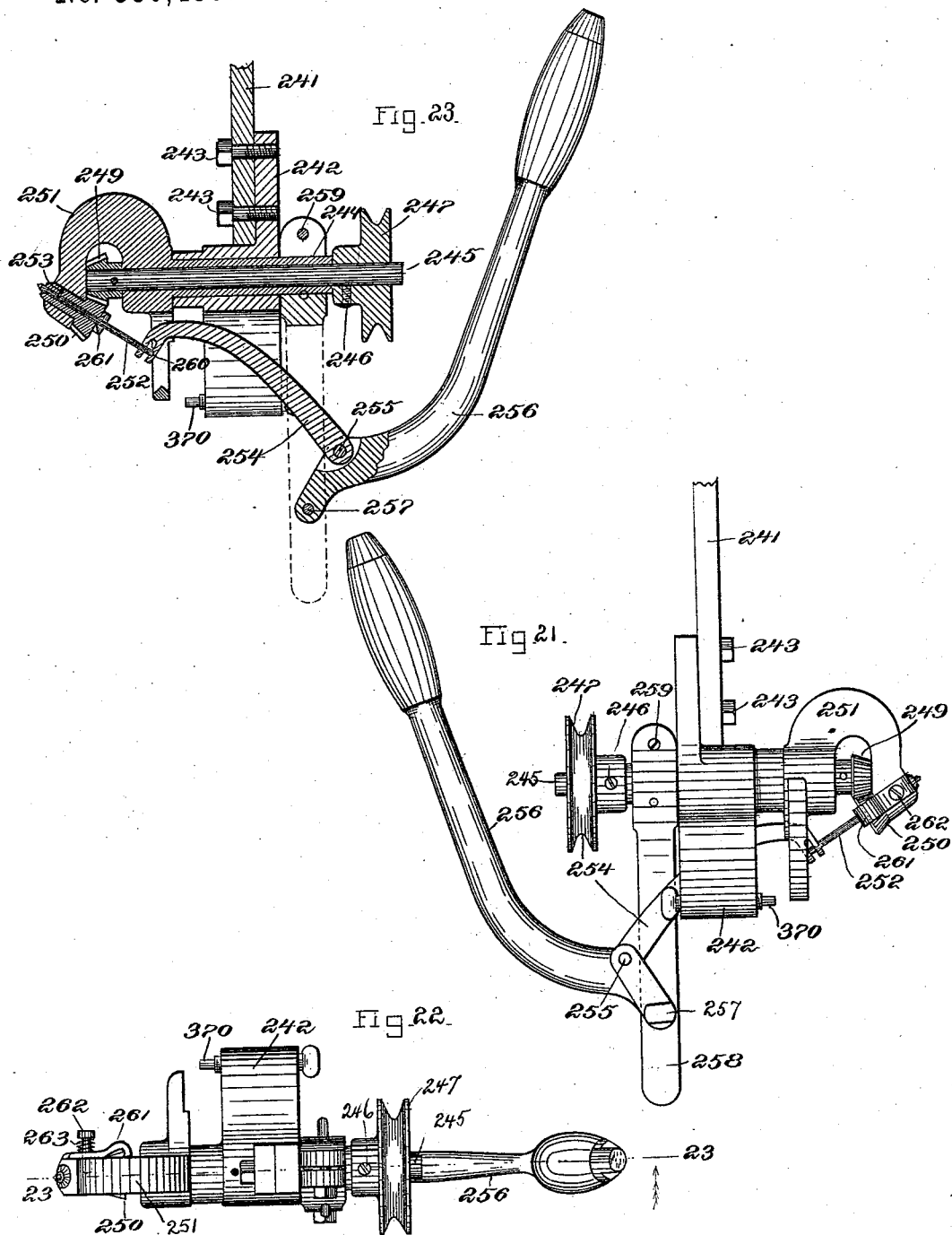

(No Model.) 10 Sheets—Sheet 10.

H. H. CUMMINGS.
MACHINE FOR PREPARING STRING FRAMINGS FOR PIANOS.

No. 556,493. Patented Mar. 17, 1896.

UNITED STATES PATENT OFFICE.

HENRY H. CUMMINGS, OF MALDEN, MASSACHUSETTS, ASSIGNOR TO THE CHICKERING & SONS, OF NEW YORK, N. Y.

MACHINE FOR PREPARING STRING-FRAMINGS FOR PIANOS.

SPECIFICATION forming part of Letters Patent No. 556,493, dated March 17, 1896.

Application filed September 28, 1895. Serial No. 563,945. (No model.)

*To all whom it may concern:*

Be it known that I, HENRY H. CUMMINGS, a citizen of the United States, residing at Malden, in the county of Middlesex and State of Massachusetts, have invented certain new and useful Improvements in Machines for Preparing String-Framings for Pianos, of which the following is a specification, reference being had therein to the accompanying drawings.

As is well understood by those acquainted with the construction of pianos, the string-framing comprises a skeleton or backing of heavy timbers, with a sounding-board secured on one side thereof and a plate of metal secured against the face of the sounding-board. In the said plate, adjacent to one edge thereof, are bored the holes through which project the tuning-pins, and the plate has surfaces in which are bored holes into which are driven the hitch-pins. On the plate, also, adjacent to one series of the holes for the tuning-pins, is formed the upper bridge for the bass-strings, and in this bridge are bored in an inclined position holes into which are driven a series of bridge-pins for the bass-strings. The sounding-board is provided with ribs adjacent to and substantially parallel with the surfaces on the plate to which the hitch-pins are applied, and in these ribs are bored holes at different angles, into which are driven the bridge-pins for the treble-strings and for the lower ends of the bass-strings.

The object of my invention is to provide means for finishing off the surfaces to which the hitch-pins are applied, and also the surfaces of the various bridges, as well as for boring the holes for the tuning-pins and the hitch-pins and for the bridge-pins of the upper bass bridge conveniently, expeditiously, and accurately.

The invention consists in an organized machine containing devices for performing the work above specified and in various novel and improved features of construction and combination which are embodied in the said machine, all as first will be described fully with reference to the accompanying drawings, and afterward will be more particularly pointed out and distinctly defined in the claims at the close of this specification.

Figure 1:
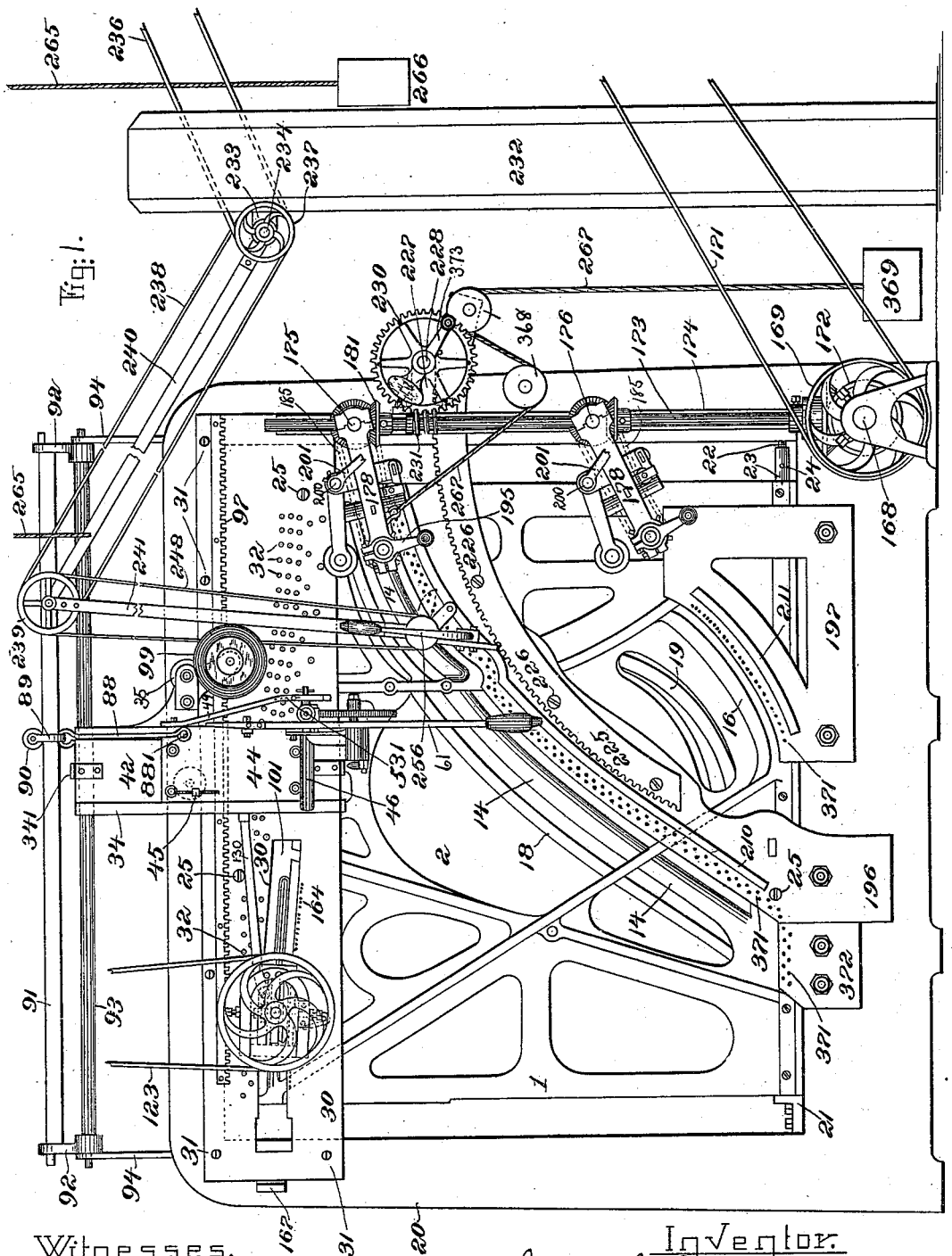
Figure 2:
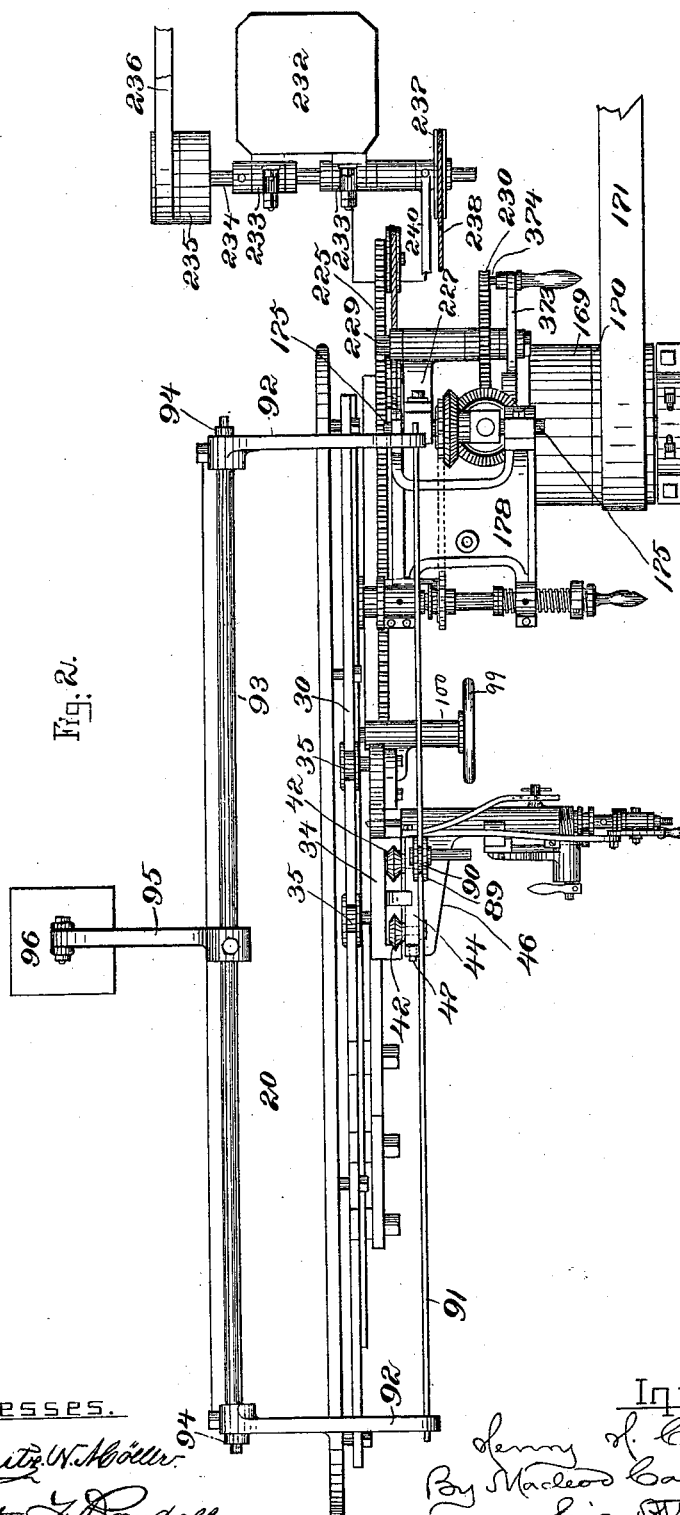
Figure 24:
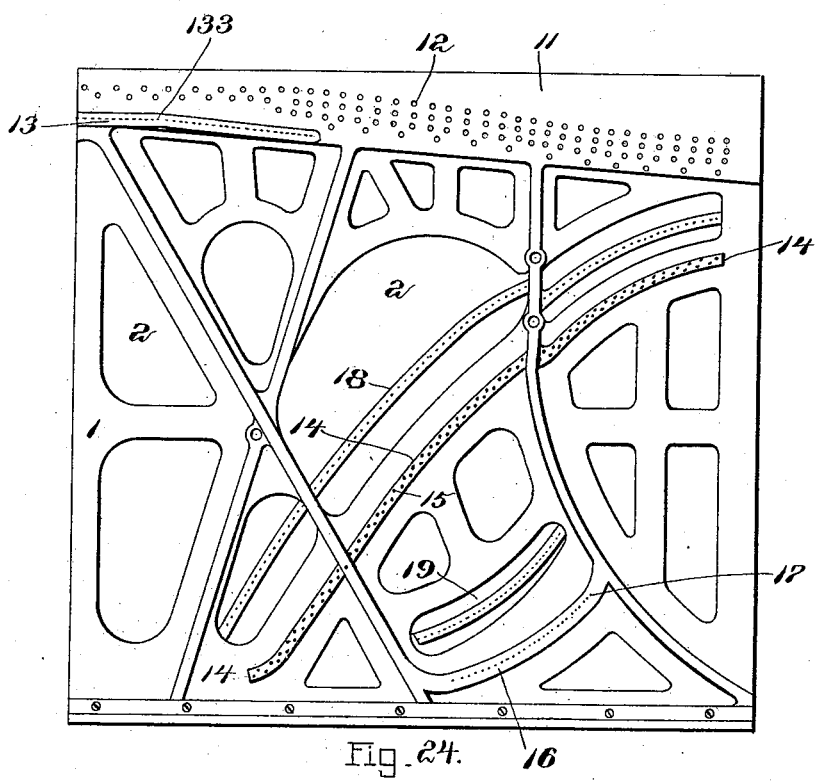

In the accompanying drawings, Figure 1 is a view in front elevation, showing the best form of my machine which I have yet devised. Fig. 2 is a view showing the same in plan. Fig. 3 is a view of the main portion thereof in rear elevation. Fig. 4 is a view in side elevation with certain parts in vertical section, showing the devices for drilling the holes for the reception of the tuning-pins. Fig. 5 is a view in section on the line 5 5 of Fig. 4 of the drill-spindle and certain of the parts adjacent and connected thereto. Fig. 6 is a view, chiefly in section, on the line 6 6 of Fig. 4, looking in the direction of the arrow adjacent to the line of section. Fig. 7 is a view in section on the line 7 7 of Fig. 6, looking downward, as indicated by the arrow. Fig. 8 is a detail view showing certain parts as seen from the opposite side in Fig. 4. Fig. 9 is a partly sectional detail of the inner end of the tube in which the drill-spindle is mounted. Fig. 10 is a view in elevation of the devices which are employed for milling off the surface of the upper bridge for the bass strings, the band-pulley being omitted. Fig. 11 is a view in section on the line 11 11 of Fig. 10, looking in the direction of the arrow near the said line of section, the band-pulley being shown in place. Fig. 12 is a view from beneath in Fig. 10. Fig. 12ᵃ is a sectional detail. Fig. 13 is a top view of the devices which are employed for boring the inclined holes in the upper bridge for the bass strings for the reception of the bridge-pins. Fig. 14 is a view in side elevation of the said drilling devices, looking from the left in Fig. 13. Fig. 15 is a view in section on the line 15 15 in Fig. 13, looking in the direction of the arrow near the said line of section. Fig. 16 is a view in plan, with a certain small part broken away adjacent to the cutter, of one of the sets of devices for milling off the surfaces where the hitch-pins are applied. Fig. 17 is a view in section on the line 17 17 of Fig. 16, looking in the direction of the arrow adjacent to the said line of section. Fig. 18 is a view in plan of the swinging frame shown in Figs. 16 and 17, it having applied thereto the auxiliary devices for finishing the surface of one of the bridges of the sounding-board, the milling-cutter and its shaft, &c., being omitted. This figure shows in section part of a templet and a surface-cam which is applied thereto for controlling the action of the cutter. Fig. 19 is a view in side elevation of the devices which are represented in Fig. 18. Fig. 20 is a detail view, partly sectional, of certain features of the devices which are shown in Figs. 18 and 19. Fig. 21 is a view, in side elevation from the right in Fig. 1, of the devices for drilling the holes for the treble hitch-pins. Fig. 22 is a view in plan of the said devices. Fig. 23 is a view in section on the line 23 23 of Fig. 22, looking in the direction of the arrow near the said line of section. Fig. 24 is a view showing in elevation a plate and the sounding-board with which it is connected.

Figs. 1 and 3 of the drawings represent the string-framing clamped in place in my improved machine and in readiness for being operated upon by the latter.

Fig. 24 shows the string-framing plate apart from the machine.

At 1 is shown the "plate," so called.

At 2 is shown the sounding-board.

At 311 312 are shown the heavy timbers constituting the skeleton.

The foregoing parts are secured together in known manner, the sounding-board 2 being placed between the plate 1 and the skeleton. In the part 11 of the plate 1 are formed the holes 12 through which project the tuning-pins. (Not shown.) Adjacent to the said part 11 the said plate 1 is formed with the bridge 13 for the bass-strings. In said bridge are drilled the inclined holes 133 for the reception of bridge-pins. At 14 14 14 are the surfaces on the said plate 1 in which are bored the holes 15 for the reception of the hitch-pins for the treble-strings. At 16 is the surface on the said plate 1 in which are bored the holes 17 for the hitch-pins of the bass-strings.

At 18 is the bridge on the sounding-board for the treble-strings, and at 19 is the bridge on the sounding-board for the bass-strings.

At 20 is the main framing of my machine. It is rectangular in form, with an opening therethrough somewhat greater in dimensions than a string-framing and preferably stands in an upright position, so that, as indicated in Fig. 1, the string-framing, when secured therein for the purpose of being operated upon, will stand in an upright position.

At 21 is a gage in the lower part of the frame 20, at one end of the said frame, against which one vertical side of the string-framing is brought to bear. I employ any suitable contrivance for maintaining the string-framing pressed endwise into contact with the said gage 21. I have shown in Figs. 1 and 3 a device comprising a screw-threaded pin 22, secured to the opposite upright of the frame 20, and a sleeve 23, which is screw-threaded interiorly and fitted upon the pin 22, the said sleeve being provided with suitable means for receiving a tool—as, for example, a hole 24—whereby to enable it to be turned on the pin 22 to either tighten it up against the string-framing or retract it therefrom in order to release said string-framing. Across the front of the frame 20 are secured a number of plates constituting templets. These templets will be more specifically described presently. Through these templets pass set-screws 25 25 25, as shown in Fig. 1. The face of the plate 1 is brought to bear against the rear ends of these set-screws, which latter determine the position of the said face.

Across the back of the frame 20, near the top thereof, as shown in Fig. 3, is passed a bar 26, which is secured at its ends by bolts and nuts 27 to the side portions of the frame 20. Between the said bar and the upper portion of the skeleton are driven wedges 28, three of such wedges being employed usually in connection with the said bar, as indicated in Fig. 3. Another wedge 28 is driven in between the lower portion of the said skeleton and a pin 29, which is connected with the lower horizontal part of the frame 20. The means of securing the string-framing in place, and determining the exact position thereof, may be of any suitable and approved character.

As shown in Fig. 1, the templet 30 extends across the front side of the frame 20 at the top of the opening which is made through the said frame and is secured in place by screws 31 31. This said templet 30 has holes 32 therethrough corresponding in position and arrangement with the required position and arrangement of the tuning-pins. Each of the said holes 32 is bushed, as at 33, Fig. 4, with hard material.

I provide the following devices for producing the holes for the tuning-pins:

34 is a frame mounted in front of the templet 30, the said frame 34 carrying rollers 35 35, which rest upon the top edge of the said templet 30. (See more particularly Figs. 1, 2, and 4.) These rollers are flanged, and the flanges thereof pass on opposite sides of the said templet 30, so as to prevent them from becoming disengaged from said templet by lateral movement. To the lower end of the frame 34 (see more particularly Fig. 4) plates 36 are secured by screws 37, these plates being recessed at 38 to receive the lower edge of the templet 30. Each plate 36 also has journaled thereon a roll 39, which bears against the front face of the templet. This roll is journaled on a vertical bolt 40, which is secured in place on the plate 36 by a nut 41. The described means of connecting the frame 34 with the templet 30 enables the frame to be moved along said templet as required.

The frame 34 has vertical side flanges, as shown most clearly in Fig. 3, and the inner sides of these flanges are formed with V-shaped grooves which receive the V-shaped edges of rolls 42 42, which are mounted on studs or bolts 43 projecting from the rear side of the plate 44. The engagement of the said rolls in the V-shaped grooves connects the plate 44 to the frame 34 with capacity for vertical adjustment of the said plate in the said frame. A screw 45, having for convenience of manipulation a wing-shaped head, as shown most clearly in Fig. 4, passes through the plate 44, and its inner end is adapted to bear against the face of the frame 34. By means of this screw 45 the plate 44 may be secured at any desired height on the frame 34. To the lower end of the plate 44 the carrier 46 for the drill-spindle and its actuating and feeding devices is connected. The holes for the tuning-pins ordinarily are bored or drilled with a slight slant to compensate for the tendency of the strings to change the position of the tuning-pins slightly by the strain which they exert thereon. To enable the drill-spindle to be set at any desired angle, the carrier aforesaid is mounted pivotally on the plate 44. Thus at one side of the plate 44 (see Fig. 2) a center-screw 47 passes through a projection on the carrier 46 and engages with the edge of the plate 44. At the other side of the said plate 44 a pin 48, (see more particularly Fig. 9,) projecting from the edge of the plate 44, fits a hole that is provided therefor in the tubular portion of the carrier 46 which constitutes the bearing for the drill-spindle. The center screw 47 and pin 48 constitute pivots, on which the carrier 46 is free to swing in a vertical direction.

For the purpose of securing the carrier 46 in position after the drill-spindle has been given the desired inclination I provide an arm 49, which is connected pivotally at 50 with one edge of the plate 44 and is provided near its free end with a longitudinal slot 51. Through this slot 51 passes a screw 52 connected with the carrier 46. By tightening up the screw 52, so as to clamp the arm 49 between its head and the side of the carrier 46, the carrier 46 may be secured in the desired position.

At 53 is a removable pin which may be passed through holes 531 in the arm 49, so as to cross the slot 51 and thereby prevent the carrier 46 from dropping below a certain position.

At 54 is the drill for producing the holes for the tuning-pins. At 55 are the split jaws of the chuck for holding the said drill. At 56 is the nut or collar for compressing the said chuck upon the drill, and at 57 is the drill-spindle to which the said chuck is applied. The said drill-spindle is fitted to turn within the tubular portion of the carrier 46, as shown most clearly in Figs. 4 and 5, and at its outer end is intended to have connected therewith by a coupling 58 one end of a flexible driving-shaft 59. Only the coupling 58 is shown in Fig. 4.

In Fig. 5 is shown a portion of the flexible driving-shaft and a portion of the sheath 60 of the latter.

For the purpose of moving the drill-spindle endwise a lever 61, (see Fig. 4,) provided with a handle, is pivoted to a link 62 that is pivotally connected with the plate 44. A pin 63 projecting from this lever passes through a hole in a projection on a sleeve 64, which latter surrounds the outer end of the drill-spindle 57. At the outer end of the sleeve 64 a collar 65 is fixed upon the drill-spindle by a clamping-screw 66. Between the inner end of the said sleeve and a shoulder 67 on the drill-spindle is placed an antifriction thrust-bearing comprising washers 68 68, between which is placed a disk 69, in which are made holes containing balls 70. The said balls are compressed between the washers 68 68. By means of the said lever 61 and the sleeve 64 endwise movement may be communicated to the drill-spindle. A spring 71, having one end thereof connected to a pin 72 on the bracket 62 and the other to a projection 73 from the lever 61, acts with a tendency to move the drill-spindle outwardly and retract the drill from the work and from the templet 30.

For the purpose of effecting the automatic feed of the drill-spindle to the work a rack 74 is pivoted to the lever 61 at 75. The said rack engages with the pinion 76, the latter being connected with the worm-gear 77. The said gear and pinion are mounted on the spindle 78, which last is mounted in a bearing provided therefor in a downwardly-extending bracket 461 that is attached to the carrier 46. The worm-gear 77 is engaged by worm 78, the latter being sleeved upon the drill-spindle 57 and being connected therewith, so that the worm and drill-spindle rotate in unison, by a key 79, which fits a longitudinal groove 80 in the said drill-spindle. A hook or fork 81 secured to the carrier 46 enters a groove 82 in the worm 78 and thereby prevents endwise movement of the worm as it rotates. The rack 74 has formed in one side thereof a longitudinal groove 83, which groove receives the eccentrically-formed end 84 of a pin 85, the said pin being journaled in the bracket 461 (see Figs. 4, 6, 7, and 8) and provided with a handle 86. A spring 87 has one end thereof connected to some portion of the carrier 46 or of the bracket 461, and the other end connected to the handle 86. The said spring acts to hold the handle and pin normally in the position which is represented in Figs. 4, 6, 7, and 8, so as to maintain the rack 74 in a depressed position and out of engagement with the pinion 76. While the rack is thus held disengaged from the pinion the lever 61 is free to be moved outwardly by the action of the spring 71, and it may be moved inwardly by hand as required.

When it is desired to occasion the automatic feed of the drill-spindle and drill after the latter has been moved up to the work by hand, the handle 86 is depressed to thereby raise the rack 74 into engagement with the pinion 76, the said pinion and connected worm-gear 77 being rotated continuously by the worm 78 so long as the drill-spindle has movement of rotation communicated thereto. When the pressure of the hand upon the handle 86 is relieved, spring 87 raises such handle and thereby moves rack 74 out of mesh with the pinion 76, whereupon spring 71 acts through lever 61 to move the drill-spindle into its outer or retracted position away from the work.

For the purpose of counterbalancing the plate 44 and the parts carried thereby, and thereby rendering it easy to adjust the same vertically within the frame 34, I connect the said plate 44 by a rod 88 with a runner 89, carrying a roller 90, which travels along a bar 91. The lower end of rod 88 connects with a pin 881 projecting from plate 44. The said bar 91 extends lengthwise of the frame 20 and is carried by the forwardly-extending arms 92 92 of a rock-shaft 93, that is journaled in uprights 94 94 rising from the frame 20. A rearwardly-projecting arm 95 on rock-shaft 93 has suspended therefrom a counterweight 96. The runner 89 is free to travel from one end to the other of the bar 91 according as the parts suspended therefrom are adjusted laterally. To prevent the plate 44 from being lifted too far relatively to frame 34 a stop 341 is secured to the upper end of the latter, it projecting out over the upper end of the said plate. For the purpose of conveniently effecting the lateral adjustment of the drilling devices a rack 97 is secured to the front of the templet 30, and with the teeth of this rack engages a pinion 98 on the shaft of a hand-wheel 99, which last is mounted in a bearing provided in a bracket 100 projecting from the frame 34.

For the purpose of milling off the surface of the bridge 13 for the bass-strings I provide as follows: The templet 30 is formed in front of the position of the said bridge, with a slot 101 extending lengthwise of the plate and having its upper and lower edges parallel with the said bridge. The outer end of the said slot is slightly enlarged, as shown clearly in Fig. 1, to facilitate the application and removal of the devices which work upon the said bridge. The milling devices are shown separately in Figs. 10, 11, and 12.

At 102 is a plate which is formed with a slot 103 therethrough, as indicated most clearly in Figs. 10 and 11. From one side of the said plate extends blocks or projections 104 105, which are rabbeted, as at 106 106, Fig. 11, to fit upon the upper and lower edges of the slot 101. The plate 102 and its blocks or projections engaging with the edges of the said slot constitute a slide fitted to move on the said edges lengthwise of the slot. To a projection at one end of the plate 102 is pivoted at 107 a frame 108 made of an open form and provided with center screws 109 109, which are passed through threaded holes in the opposite sides of the said frame 108. The tapered inner ends of the said center screws fit into depressions in the opposite ends of the arbor 110. The said arbor has an enlarged head 111 at one end thereof and is screw-threaded at the other end, as at 112. Upon the said arbor are mounted the bevel-gear 113 and the milling-cutter 114, these two being connected together by screws 115 and being held on the arbor by a nut 116, all as clearly shown in Fig. 11. Bevel-gear 113 is in mesh with a bevel-pinion 117, fixed on the inner end of a shaft 118, the said shaft being mounted in bearings in a yoke 119 and the latter being secured by screws 120 to the swinging frame 108. A band-pulley 121 is secured to the outer end of the shaft 118 by clamping-screw 122 and receives a driving-band 123. (Shown in Fig. 1.) The center screws 109 109 are hollow, as indicated in Fig. 11, for the admission of oil to the bearings, and the upper one of the said screws (see Figs. 10 and 11) has the head thereof hollowed out to form a small oil-chamber, while the lower one of such center screws has connected therewith an oiling-tube 124, which is bent upwardly at the free end thereof.

The swinging frame 108 is capable of being turned upon its pivot at 107, so as to adjust the cutter 114 toward and from the surface of the bridge 13. Through the free end of said frame 108 pass set-screws 127 127, the inner ends of which engage with framing 102 to determine the extent of the movement of the cutter toward the work. A spring 192, acting upon the frame 108, tends to withdraw the cutter from the work. From the frame 102 extends a threaded stud, it passing loosely through a hole in frame 108. (See Fig. 12ª.) Upon the outer end of this stud is fitted a pin 125, which is hollow for a portion of its length and internally threaded to fit upon the stud 125, it being provided with a handle for the purpose of enabling it to be turned by hand conveniently. This pin serves as a means of forcing the cutter toward the work. The upper surface of frame 102 has a rounded cavity therein, in which fits a collar 126 having a rounded under side. This collar is interposed between the lower end of pin 125 and the frame 108 and accommodates itself to the variations in the position of the frame.

The foregoing devices enable the cutter to withdrawn from the work when it is desired to move the milling devices along slot 101 in returning them to the starting-point.

For the purpose of moving the slide and milling-cutter lengthwise of the slot 101 a bar 130 is pivotally connected to the frame 34 at one end, it being provided at the other end with an open-ended inclined slot 131, which enables such end to be hooked over a screw 132 on the plate 108. Thereby as the hand-wheel 99 is turned and the frame 34 is moved longitudinally of the templet the milling devices are advanced lengthwise along the bridge 13.

For the purpose of drilling in the bridge 13 the inclined holes 133 for the reception of the bridge-pins, which are to be applied to the said bridge, I provide the devices which are shown in Figs. 13, 14 and 15. These devices are applied to the slot 101 after the milling devices have been removed, and they are constructed as follows:

At 134 is a small framing provided with bearings for the drill-spindle 135, to the inner end of which is applied the chuck 136, in which latter is secured the drill 137. On the said drill-spindle 135 a band-pulley 137 to receive the driving-band 123 is made fast by a clamping-screw 138. Between collars 139 and 140 on the outer end of the shaft is fitted a sleeve 141, through a hole in which passes a pin 142, the said pin also passing through the opposite sides of a hand-lever 143, the latter having a slot 144 therethrough, which receives the said sleeve 141, as shown clearly in Fig. 15. The hand-lever 143 is pivotally connected by a pin 145 to a link 146, which last in turn is pivotally connected by a pin 147 to the frame 134. A washer 148 intervenes between the collar 139 on shaft 135 and the adjacent end of the sleeve 141. The collar 140 is secured on the shaft 135 by the clamping-screw 149. The hand-lever 143 and connections described enable the drill to be advanced to the work and withdrawn.

At 150 is a guide through which the drill 137 passes, the said guide being intended to prevent the drill from deviating from its proper position, as it would be likely to do in the absence of such guide, owing to its small diameter and the inclined direction in which it approaches and enters the work. The said guide 150 is secured in place on the framing 134 by means of the screws 151 and 152, which are shown in Fig. 14. From the inner end of the framing 134, above and below the bearing for the inner end of the drill-spindle 135, extend the pieces 153 and 154. The piece 153 has an upturned lip 155, and to the said piece 153 at a distance from the lip 155 which is equal to the thickness of the templet 30 is secured a piece 156 by means of a bolt 157. The space between the the lip 155 and the piece 156 is intended to receive one edge of the slot 101 in the plate 30. To the under side of the piece 154 is secured by means of a screw 158 a piece 159 formed with lips 160 160 to fit on opposite sides of the other edge of the slot 101.

As will be seen, the framing 134, together with the parts last described, constitutes a slide which is adapted to be placed in the slot 101 and to engage with the edges of the said slot and be guided thereby.

At 161 is a small bracket that is secured to the piece 153 by means of a screw 162 and is provided with a pin 163 adapted to be engaged by the slotted end of the bar 130 for the purpose of enabling the drilling devices, which have just been described, to be moved from the frame 34.

Adjacent to the lower edge of the slot 101 is a series of holes 164 disposed in a line corresponding with that of the bridge and spaced apart in like manner as is required in the case of the bridge-pins. These holes 164 are intended to co-operate with the index-pin 165, which is provided on the framing 134, said pin being constructed with a threaded stem which fits a threaded hole in the framing 134 and having a handle 166, constituted by a cross-wire inserted through the head of the pin. The purpose of the said threading and handle is to enable the pin to be turned, if desired, in order to retract the pin 165 into its hole in the framing, or cause it to project therefrom into position to enter the holes 164. For the purpose of preventing the parts from being carried too far to the left in Fig. 1, a stop 167 is secured adjacent to the left-hand end of the slot 101 in position to be engaged by either the milling attachment or the drilling attachment or the frame 34 in case of it being carried to the extreme left.

I provide the following devices for milling-off the surfaces 14 into which the hitch-pins for the treble-strings are to be inserted and the surface 16 into which the hitch-pins for the bass-strings are to be inserted.

At 168 is a stud mounted in suitable brackets at the lower right-hand corner of the frame 20 and having mounted loosely thereon the band-pulleys 169 170 for the reception of the driving-band 171. By means of bevel-gear 172, fast with pulley 169, motion is transmitted from the said pulley 169 to an upright shaft 173, the latter being mounted in bearings that are connected to a frame or arm 174 swinging about the stud 168.

At 175 176 are studs fixed in the arm or frame 174. Fig. 16 shows the stud 175, it passing through the arm or frame 174 so that the greater portion thereof projects on one side of the latter, while a short portion thereof projects on the other side, the said stud being fixed in place in the said arm or frame by clamping-screw 177.

At 178 is a frame having at one end thereof bearings which fit upon the opposite ends of the studs 175, the said ends constituting pivots or journals on which the said frame 178 is free to swing. A portion of the stud 175 is squared and has formed therethrough an opening through which the shaft 173 passes, this portion of the stud thereby affording a bearing for the said shaft. On a cylindrical portion of the stud adjacent to the said squared portion is mounted to turn a bevel-gear 179, having connected therewith a sprocket-wheel 180. The bevel-gear 179 meshes with a bevel-gear 181 fast on the shaft 173 and is driven thereby. At the free end of the swinging frame 178 is carried a cutter-shaft 182. The latter has mounted thereon a sprocket-wheel 184, which is keyed to the cutter-shaft so as to rotate in unison therewith. 218 is the groove in the cutter-shaft for the reception of the key carried by the sprocket-wheels 184.

183 is a piece having at is free end a projection which enters a groove 318 in the hub of sprocket-wheel 184 to prevent lateral movement thereof.

A sprocket-chain 185, which is indicated by dotted lines in Figs. 1, 16 and 17, connects the sprocket-wheels 180 and 184 and enables the cutter-shaft 183 to be driven.

At the inner end of the cutter-shaft 182 is mounted the milling-cutter 186. The inner end of the said cutter-shaft has its bearing in the sleeve 187 that is mounted in the swinging frame 178, the said sleeve having mounted upon the exterior thereof the flanged roll 188, which latter is held in place on the said sleeve by the lip or flange 189 at the end of the latter. The bearing for the outer end of the cutter-shaft 182 is provided in a sleeve 190, the latter being screw-threaded exteriorly and fitted to an interiorly-threaded portion 191 of the frame 178. The said sleeve 190 fits between collars 192 and 193, which are made fast on the cutter-shaft 182 by clamping-screws 194 194. The sleeve has a handle 195, by means of which it may be rotated for the purpose of feeding the cutter-shaft inwardly or outwardly, as may be required. The roll 188 rests normally on the upper edge of the templet 196, the said edge having the same curvature as the surfaces 14. Thereby as the arm or frame 174 is swung around the axis of the stud 168 and the roll 188 is caused to travel along the upper edge of the templet 196 the outer end of the frame 178 is caused to rise and fall conformably with the curvature of the surfaces 14, so as to enable the milling-cutter 186 properly to dress off or mill the face thereof.

The foregoing parts are duplicated in connection with the stud 176, and the roll on the cutter-shaft of the swinging frame 178 which is applied to the said stud 176 coacts with the upper edge of a templet 197, the said upper edge being shaped to agree with the curvature of the surface 16 into which are inserted the hitch-pins for the bass strings.

I provide as follows for dressing off the surfaces of the bridges 18 and 19 on the sounding-board:

Each of the frames 178 is formed with upwardly-projecting lugs 198 198, which are bored, as indicated at 199 in Fig. 17, to constitute bearings for a rock-shaft 200, as shown more particularly in Figs. 18 and 19. This rock-shaft has at one end thereof a handle 201, which is partly broken away in Fig. 1 for the sake of clearness. Between the bearings 198 198 the said rock-shaft 200 has fitted thereto a frame 202, (see Figs. 18 and 19,) which is constructed with arms that are bored to fit upon the rock-shaft 200 and are clamped thereto by screws 203 203.

At 204 is a cutter-shaft which is provided with a band-pulley 205 that is made fast thereon by a clamping-screw 206. The said cutter-shaft turns in bearings which are provided therefor in the outer end of frame 202, and it is provided with a collar 207 that is secured thereon by a clamping-screw 208, the said collar being located adjacent to one of the bearings and serving to guard against endwise movement of the cutter-shaft away from the work.

At 209 is a cutter for dressing off the surface of the bridge, it being secured in suitable manner to the inner end of the cutter-shaft 204. A driving-band—as, for example, band 248, or any other band similarly supported and driven—having been applied to the band-pulley 205, and the cutter 209 having been brought into engagement with the bridge upon which it is to act, the said cutter is caused to traverse the length of the said bridge by the swinging movement which is communicated to the arm or frame 174. As the parts are moved in the direction of the length of the bridge, the handle 201 is moved by hand to cause the cutter to follow the curvature of the bridge.

In order to compensate for the deflection of the sounding-board and bridge which results from the strain of the strings, it is necessary to make the bridge somewhat higher or thicker at an intermediate portion of the length thereof, where it is most deflected in use, and to taper off the height or thickness in opposite directions.

In order to secure accurately and conveniently the proper variation in the height or thickness of the bridge, I provide as follows:

210 is a strip affixed to the templet 196 and made to correspond in curvature with the bridge 18. 211 is a corresponding strip that is applied to the templet 197 and corresponding in curvature with the bridge 19. Each of the said strips varies in height or thickness in precisely the manner that is required of the corresponding bridge on the sounding-board.

At 212 (see Figs. 18 and 20) is a roller that is carried by a bar 213, which latter slides through a hole in a lug 214 that projects downwardly from the frame 178. This bar 213 is pivotally joined to an arm 215, which is secured on the lower end of a rock-shaft 216. The said rock-shaft is mounted in a bearing 217 (see Figs 16 and 17) that is provided therefor in the frame 178. At 218 is an arm on the upper end of the said rock-shaft. The arms 215 and 218 are made fast on the rock-shaft by clamping-screws 219 219. The free extremity of the arm 218 is rounded and enters between the collars 220 220, which are secured by clamping-screws 221 221 upon the rock-shaft 200. A spring 222 has one end thereof connected to a pin 223 on the frame 178, and has the other end thereof connected to a pin 224 projecting from the frame 202. The said spring draws the frame 202 toward the work, and through the rock-shaft, its arms, &c., causes the roller 212 to follow the contour of the strip 210 or 211.

I provide the following means of automatically swinging the arm or frame 174 so as to carry the frames 178 178 along the templets 196 197.

At 225 is a rack which is secured by screws 226 to the templet 196. Its upper edge is toothed and concentric with the stud 168. The arm or frame 174 is provided with a bracket 227, containing the bearing for a short shaft 228. The said shaft carries a pinion 229 that engages with the teeth of the rack 225, and also has mounted loosely thereon a worm-gear 230 that is engaged by a worm 231 on the shaft 173, which is carried by the arm or frame 174 aforesaid. Thus as the shaft 173 is rotated it operates the worm-gear 230. A handle 373 is made fast on the shaft 228 and provided with a pin 374, which, when desired, may be caused to engage with the worm-gear 230. When the pin is engaged with the worm-gear, the latter is made fast to shaft 228, so that the latter turns in unison with the worm-gear. In consequence of the engagement of the pinion 229 on shaft 228 with the teeth of the rack 225 the rotation of shaft 228 effects the feed of the frames 178 178 and the cutters which are carried thereby. After disengaging the pin 374 from the worm-gear 230 the arm or frame 174 and connected parts may be returned to their original position by rotating shaft 228 by hand. For the purpose of drawing the frame 178 downwardly, so as to hold the flanged roll 188 pressed against the edge of the templet 196, I connect a rope 267 to a hook on the said frame. The said rope passes thence around the pulleys 368 368 on the frame 20 and rack 225 and suspends a weight 369.

For the purpose of drilling the inclined holes in the surfaces 14 and 16 for the reception of the hitch-pins I provide the following devices, which are shown in place in Fig. 1 and in detail in Figs. 21, 22, and 23. For the sake of clearness these parts are mostly omitted from Fig. 2.

At 232 is a post or standard having brackets 233, which contain bearings for a driving-shaft 234, provided with fast and loose pulleys 235 for the reception of a driving-band 236 by means of which to actuate the said shaft. The shaft has fast thereon a band-pulley 237, around which passes a band 238, which extends to and around one of a pair of connected band-pulleys 239, the latter being located at the outer end of a bar 240, which last is mounted upon the shaft 234 with capacity to swing around the same. A second bar or yoke 241, having its upper end pivoted to the free end of the bar 240 concentrically with the pulleys 239, carries at its lower end the drilling devices, which I shall now proceed to describe.

At 242 (see Figs. 21, 22, and 23) is a small framing, which is secured to the lower end of bar 241 by screws 243, and is provided with a sleeve 244, passing loosely therethrough and forming the bearing for a short shaft 245, at one end of which is made fast by a set-screw 246 a band-pulley 247, which receives a band 248, (see Fig. 1,) the latter also passing around the second of the connected pulleys 239. At the end of the shaft 245 opposite to that on which the band-pulley 247 is fixed there is secured a bevel-pinion 249, meshing with a second bevel-pinion 250, the latter having a prolonged hub which turns in a bearing that is provided therefor in the yoke 251, the latter being integral with the sleeve 244.

The pinion 250 has a central bore, as shown most clearly in Fig. 23, through which passes the drill 252, the drill and pinion being caused to rotate in unison by means of a pin or screw 253 in the hub of the said pinion, the said pin or screw having its point projected into the said central bore into position to enter the longitudinal groove that is formed in the drill. The axis of the drill is located at an angle, as shown in Figs. 21 and 23, to give the proper inclination to the drill. The outer end of the drill is engaged by the link 254, which in turn is pivotally connected at 255 with the handle 256, the latter being pivoted at 257 to a depending arm 258. The arm 258 and parts applied thereto are of sufficient weight to cause them to gravitate into a vertical position, whatever may be the movement that is communicated to bar 241 and framing 242. This construction, moreover, enables the drilling devices to be swung in either direction around shaft 245 and to any required extent. The upper end of the arm 258 is shaped to fit upon the projecting end of the sleeve 244 and is split, being provided with a screw 259 to enable it to be clamped upon a sleeve. The outer end of the drill is connected with the link 254 in a manner which enables it to rotate freely, but at the same time compels the drill to move lengthwise as the handle 256 is moved. To this end the link 254 is made forked, as shown clearly in Figs. 21 and 23. The drill passes through a hole in one branch of the fork, and between the two branches has a cross-pin 260, passed therethrough to prevent it from becoming disengaged from the link.

At 261 is a retainer, made in the shape of a bent finger, which passes around and behind the pinion 250 to prevent the latter from becoming displaced. A screw 262 passes through a hole in the retaining-finger 261 and enters the yoke 251. The retaining-finger 261 is free to play in and out along the stem of the said screw, but is passed inwardly into operative position normally by means of a spiral spring 263, which latter is placed upon the stem of the screw and between the head thereof and the said retaining-finger. By means of a rope 265, connected with the bar 240 and passing thence over pulleys at an elevation (not shown) and suspending by its other end a weight 266, the drilling devices are counterbalanced.

At 370 is an index-pin on the framing 242, the point thereof being intended to enter successively the index-holes 371, which are formed in the templets 196, 197, and 372, the last of which templets is secured adjacent to the lower end of the templet 196.

The supports of the drilling devices enable the same to be swung down to the various points at which holes are to be bored in the surfaces 14 and 16, and also to be turned into the position which is required for producing the respective holes at the proper angle for each.

I claim as my invention—

1. An organized machine for preparing the string-framings of pianos, comprising means to clamp and support the string-framing in position to be operated upon, devices to dress off the faces on the plate where the hitch-pins are applied and also the faces of the bridges on the plate and sounding-board, devices to drill the holes for the tuning-pins and hitch-pins, and templets to direct the dressing-off and drilling operations aforesaid, substantially as described.

2. An organized machine for preparing the string-framings of pianos, comprising means to clamp and support the string-framing in position to be operated upon, dressing-off devices made movable along the bridges on the plate and sounding-board and the surfaces where the hitch-pins are applied, drilling devices movably mounted to enable them to be brought to the successive points where the holes are to be made for the reception of the tuning-pins and hitch-pins, and templets to direct the dressing-off devices and locate the various holes, substantially as described.

3. The combination with the supporting-frame, and means for securing a string-framing in place therein, of the templet 30 having the holes 32 corresponding with the holes to be produced for the reception of tuning-pins, the frame 34 movable along the said templet, the rack 97, the connected hand-wheel and pinion in engagement with the said rack for causing the movement of the frame 34 along the templet, the plate mounted on said frame 34 and movable vertically thereon, the drilling devices carried by the said plate, and means to counterbalance the said plate and the parts which are mounted thereon, substantially as described.

4. The combination with a templet 30 having holes therethrough, of a frame movable along the said templet, a plate movable upon the said frame, drilling devices connected with the said plate, and having a drill which passes through the holes in the templet, and means to enable the angle of the drill to be varied as required, substantially as described.

5. The combination with the drill-spindle, of feed devices comprising gearing actuated from the said drill-spindle, a rack actuated by the said gearing and connected with the drill-spindle to move the latter endwise toward the work, a spring operating with a tendency to move the drill-spindle outward from the work, a handle, devices connected therewith to make and break the operative connections in the train of parts intermediate the drill-spindle and the rack, and means to maintain normally a break in such connections, substantially as described.

6. The combination with the drill-spindle, and a worm rotated thereby, of a worm-wheel engaged by the said worm, a pinion, a rack, a handle, devices connected with the handle to place the rack in and out of engagement with the pinion, means operating to hold the rack normally disengaged from the pinion, devices connected with the rack to move the drill-spindle lengthwise, and means to withdraw the drill-spindle from the work upon the disengagement of the rack from the pinion, substantially as described.

7. The combination with the drill-spindle, and a worm rotated thereby, of a worm-wheel engaged by the said worm, a pinion, a rack to be engaged by the said pinion, a pin 85 having an eccentrically-disposed portion in sliding engagement with the rack, the handle applied to the said rack, means acting to hold the pin normally in position to disengage the rack from the pinion, the lever 61 connected with the rack and with the drill-spindle, and a spring acting upon said lever to hold the drill-spindle retracted, substantially as described.

8. The combination with a support for the string-framing of a piano, and milling devices, of a templet having a guide-surface conformed in position and curvature to a surface on the plate of the said string-framing to which string-pins are to be applied, and means to move the milling devices along the templet to dress off the said surface, substantially as described.

9. The combination with a support for the string-framing of a piano, of a templet having a slot 101 corresponding in shape and position with a bridge on the said string-framing, milling devices provided with a framing fitted to slide in the said slot, and means to move the milling devices along the templet to dress off the face of the bridge, substantially as described.

10. The combination with a templet or guide, of milling devices comprising a framing fitted to slide on the said templet or guide, a milling-cutter, a support for the said milling-cutter, means to adjust the said support on the said framing toward and from the work, means to rotate the said milling-cutter, and means to move the said milling devices along the templet or guide, substantially as described.

11. The combination with a support for the string-framing of a piano, and a templet having a slot 101, of milling devices comprising a framing fitted to slide in the said slot, a milling-cutter, a support for the said milling-cutter, means to adjust the said support on the said framing toward and from the work, means to rotate the said milling-cutter and means to move the said milling devices along the templet or guide, substantially as described.

12. The combination with a templet or guide, conforming in shape to the work, of drilling devices comprising a framing fitted to slide on said templet or guide, a drill-spindle carried by the said framing and standing at an angle to bore inclined holes in the work, and index devices to enable the holes to be spaced and located properly in the work, substantially as described.

13. The combination with a support for the string-framing of a piano, and a templet having a slot 101 corresponding in position and form with a bridge on the plate, of drilling devices comprising a framing fitted to slide in the said slot, a drill-spindle carried by the said framing and standing at an angle to bore inclined holes in the bridge, and index devices to enable the holes to be spaced and located properly in the bridge, substantially as described.

14. The combination with a templet having a slot 101 corresponding in position and form with a bridge on the plate, and also having adjacent to said slot a series of indicators for use in locating the positions of the holes in the work, of drilling devices comprising a framing fitted to slide in the said slot and having portions to receive between them each of the edges of the said slot, a drill-spindle carried by the said framing and standing at an angle, to bore inclined holes in the bridge, and an index device carried by the said framing to co-operate with the series of indicators aforesaid in determining the portions of the holes that are produced by the drill, substantially as described.

15. The combination with a support for the string-framing of a piano, of dressing-off devices to act on the face of a bridge on the sounding-board, means to move the said devices along the bridge to dress off the face of the latter, and guiding means to shift the said devices laterally to cause them to follow the transverse curvature of the bridge, substantially as described.

16. The combination with a support for the string-framing of a piano, of dressing-off devices to act on the face of a bridge on the sounding-board, means to move the said devices along the bridge to dress off the face of the latter, and means to move the said devices in a direction toward and from the work to vary the height of the bridge in different portions thereof, substantially as described.

17. The combination with a support for the string-framing of a piano, of dressing-off devices to act on the face of a bridge on the sounding-board, means to move the said devices along the bridge to dress off the face of the latter, a cam along which the said devices are carried, and devices acted upon by the said cam and connected with the dressing-off devices, whereby to regulate the approach of the latter to the work and vary the height of the bridge in the different portions thereof, substantially as described.

18. The combination with a support for the string-framing of a piano, of a templet having a guide-surface conforming to the curvature of a surface on the plate where hitch-pins are applied, milling devices to mill off the said surface, means to move the said milling devices along the said guide-surface of the templet, dressing-off devices to act on the surface of the adjacent bridge on the sounding-board, and means to connect the said dressing-off devices with the milling devices to cause both sets of devices to be traversed by the same means, substantially as described.

19. The combination with a support for the string-framing of a piano, of a templet having a guide-surface conforming to the curvature of a surface on the said string-framing where hitch-pins are to be applied, milling devices to mill off the said surface, a support for the said milling devices resting in contact with the said guide-surface, a swinging arm or frame with which said support is pivotally connected, means to swing said arm or frame to carry the milling devices along the templet, and means of transmitting movement to the milling devices, substantially as described.

20. The combination with a support for the string-framing of a piano, of a templet having a guide-surface conforming to the curvature of a surface on the said string-framing where hitch-pins are to be applied, milling devices to mill off the said surface, a support for the said milling devices resting in contact with the said guide-surface, a swinging arm or frame with which the said support is pivotally connected, a shaft extending lengthwise of said arm or frame and rotating in bearings carried thereby, means of transmitting motion to the shaft carried by the arm or frame, and driving connections to operate the milling devices from the latter shaft, substantially as described.

21. The combination with a support for the string-framing of a piano, of a templet having a guide-surface conforming to the curvature of a surface on the said string-framing where hitch-pins are to be applied, milling devices to mill off the said surface, a support for the said milling devices resting in contact with the said guide-surface, a swinging arm or frame with which the said support is pivotally connected, a shaft extending lengthwise of said arm or frame and rotating in bearings carried thereby, means of transmitting motion to the shaft carried by the arm or frame, and driving connections to operate the milling devices from said shaft, a fixed rack, and feed-gearing engaging with the said rack and operated by the said shaft, whereby the milling devices are traversed along the templet, substantially as described.

22. The combination with a support for the string-framing of a piano, and templets having guide-surfaces conforming to the respective curvatures of the upper and lower surfaces on the plate where hitch-pins are to be applied, of upper and lower sets of milling devices to mill off the respective surfaces, a support for each set of such devices resting in contact with one of the said guide-surfaces, a swinging arm or frame with which both of the said supports are pivotally connected, a rotating pulley located at the pivotal end of said arm or frame and means of driving the said milling devices from the said rotating pulley, substantially as described.

23. The combination with a templet having indicator-holes therein corresponding in position and arrangement with the holes that are required in the work of drilling devices provided with an index-finger to enter such holes, and also with a drill mounted in an inclined position relatively to its carrier and a movable support for said carrier in which the latter is free to gravitate into a vertical position and also free to be turned in order to place the drill in the required position for forming each hole, substantially as described.

In testimony whereof I affix my signature in presence of two witnesses.

HENRY H. CUMMINGS.

Witnesses:
CHAS. F. RANDALL,
ALICE H. MORRISON.